United States Patent [19]
Hope et al.

[11] Patent Number: 6,089,629
[45] Date of Patent: Jul. 18, 2000

[54] UNDERRUN GUARD FOR ROAD VEHICLES

[75] Inventors: Frederick John Charles Hope; Robert James Hope, both of Chobham, United Kingdom

[73] Assignee: Hope Technical Sales and Services Ltd., Berkshire, United Kingdom

[21] Appl. No.: 09/088,481

[22] Filed: Jun. 2, 1998

[30] Foreign Application Priority Data

Jul. 29, 1997 [GB] United Kingdom .................... 9716015

[51] Int. Cl.$^7$ ................................................... B60R 19/26
[52] U.S. Cl. ........................................... 293/132; 293/102
[58] Field of Search ............................. 293/12, 102, 103, 293/118, 119, 132, 155

[56] References Cited

U.S. PATENT DOCUMENTS

| | | | |
|---|---|---|---|
| 3,370,878 | 2/1968 | Carr | 293/118 |
| 3,871,695 | 3/1975 | Koenig | 293/118 |
| 4,247,138 | 1/1981 | Child | 293/103 |
| 4,359,239 | 11/1982 | Eggert, Jr. | 293/132 |
| 4,541,661 | 9/1985 | Hawk | 293/132 X |
| 5,507,546 | 4/1996 | Holley | 293/102 X |
| 5,624,143 | 4/1997 | Waldschmitt | 293/118 |

FOREIGN PATENT DOCUMENTS

| | | | |
|---|---|---|---|
| 502469 | 9/1992 | European Pat. Off. | 293/102 |
| 1361045 | 12/1987 | U.S.S.R. | 293/102 |

*Primary Examiner*—D. Glenn Dayoan
*Assistant Examiner*—Paul Chenevert
*Attorney, Agent, or Firm*—Sughrue, Mion, Zinn, Macpeak & Seas, PLLC

[57] ABSTRACT

An underrun guard for a road transport vehicle is disclosed comprising a beam intended to be supported across the rear of the vehicle by a support mechanism which yields under a force which would otherwise be likely to cause damage to the vehicle. The support mechanism comprises at least one first for attachment to the beam and at least one second plate for attachment to the vehicle, and a clamping member for clamping the plates together while permitting relative sliding movement between said first and second plates when a substantial force is applied to the bean. A high friction element may be sandwiched between the first and second plates to increase the sliding friction generated on relative movement of the plates, thereby increasing the reaction force restraining such movement.

13 Claims, 5 Drawing Sheets

UNDERRUN GUARD FOR ROAD VEHICLES

BACKGROUND OF THE INVENTION

This invention relates to underrun guards for motor vehicles in which a horizontal beam is fitted to the vehicle to reduce the risk of smaller vehicles being forced beneath the guarded vehicle in a collision.

It has long been recognized in many countries that deaths and injuries can be reduced in road accidents involving road transport vehicles by providing underrun bumpers or guards, especially at the rear of the road transport vehicle. What often happens in a rear end impact collision is that a passenger car runs beneath the rear end of a transport vehicle with the result that the passenger compartment is totally crushed. This gives rise to a much greater risk of serious injuries or death among passengers in the car.

As a result, in many jurisdictions, regulations have been introduced requiring road transport vehicles to fit a protective guard or bumper at least at the rear of the vehicle, to prevent so-called underrun accidents. While a fixed, rigid beam supported from brackets depending from the chassis will meet safety requirements of many countries, a problem with such rigid guards is that in every day use they tend to be damaged or deformed, e.g. by reversing the vehicle into loading bays and loading bay equipment or in collision with loading vehicle such as forklift trucks. Once the guard is damaged, the operator of the transport vehicle is no longer confident that the guard meets the requirement of the relevant legislation in the country in which the vehicle is used.

Also, in the event that damage does occur, the operator may not be confident that the guard meets the specification required unless the complete guard is replaced, There have also been proposals to employ vehicle underrun guards in which the impact energy arising from a collision is absorbed by hydraulic or pneumatic cylinders, or by a sacrificial, deformable component. A problem with these designs is that, generally, they are too expensive or require constant maintenance to ensure that they meet safety and legislative requirements.

SUMMARY OF THE INVENTION

An object of the present invention is, therefore, to provide a underrun guard for a road transport vehicle which is capable of reliably absorbing energy of impact up to the requirements of relevant legislation, which is economical to manufacture and which after a low or moderate energy impact is readily restored to full operating use in a way which complies with the relevant legislation.

According to one aspect of the present invention there is provided an underrun guard for a road transport vehicle which comprises a beam intended to be supported across the rear of the vehicle by support means, said support means comprising a bracket for attachment to the rear of the vehicle and a frictional restraint connecting the bracket to the vehicle, said resaint being adapted to absorb impact energy applied to the beam and to permit the beam to pivot to prevent excessive damage to the beam.

The invention also includes a road transport vehicle having a front portion and a rear portion and an underrun guard fitted to said rear portion to reduce the risk of a second vehicle smaller than said road transport vehicle being forced under said rear portion in a collision, said guard comprising a beam extending horizontally substantially across said rear portion and support means for supporting said beam, said support means comprising a first plate fixedly attached to the beam or to said rear portion and a second plate or plates fixedly attached to the other of said vehicle or beam, said first and second plates being pivotally connected to each other so that relative pivoting movement of said plates is resisted by friction generated between said plates.

The frictional restraint preferably comprises at least two plates which are clamped together, one of which is secured to the rear portion of the vehicle and the other to the beam The two plates are capable of pivotal movement with respect to each other but such pivotal movement is resisted by frictional contact between surfaces of the plates, or between the surfaces of the plates and a frictional element sandwiched between the plates. The degree of restraint can be tailored for specific requirements by adjustment of the clamping pressure, provision of a larger frictional contact area, e.g. by providing a multiplicity of plates, and/or by providing a high friction material between the contacting surfaces of the plates. Most conveniently, one or more frictional elements are interposed between the plates, although it is possible to coat the contacting portions of the plates with material having a high coefficient of friction.

Materials which may be used as the frictional element include plastics materials, e.g. acetal or pvc or a metal or metal oxide or friction material. Where steel is employed to form the support means, the frictional element which is sandwiched between them may comprise a different metal, e.g. brass. The preferred frictional element is manufactured from non-asbestos brake lining material which is capable of withstanding the elevated temperatures and shear forces generated by high fiction. Suitable materials include materials used for clutch linings.

Conveniently, the beam is supported at two points to the vehicle. Typically, legislation requires the fixing points to be within about 350 to about 640 mm outwardly from the center-line of the vehicle.

Preferably, each support means comprises a first plate fixedly attached at one end to the beam or the vehicle and a pair of clamping plates for clamping a segment of the first plate therebetween. The clamping or quadrant plates are fixedly attached at one end of the other of the vehicle and the beam and all three plates are pivotally mounted about a common pivot point. The clamping plates, which may be in the form of a quadrant, may be held together sandwiching a sector of the first plate therebetween by one or more clamping bolts which pass through slots in the clamping plates and/or in the first plate. By selecting the coefficient of friction between the plates (or between the plates and an interposed high friction element), the contacting area and the torque under which the clamping bolts are tightened, the degree of frictional restraint which resists pivoting movement of the plates can be established. The energy absorbed by the guard when sustaining an impact to the beam is calculated by applying a known force to the beam and measuring the deflection of the beam. The energy absorbed is the area under the force-deflection curve when these values are plotted graphically.

The degree of restraint exerted by the plates will be selected depending on the legislation in the particular area where the road vehicle is employed. For example, the current US standards require that the guard should absorb at least 5650 joules (4166 ft.lb) of energy without deflecting more than 125 mm (15 inches). In general, of course, it will be desirable to provide sufficient restraint and resistance to movement of the beam which would exceed these minimum requirements. Also, as the above standard is met by a rigid guard which is substantially deformed in the test, it is desirable to provide a guard which yields sufficiently to meet this standard and, at the same time, can be reset to comply with the standard in a second or subsequent test. The frictionally yielding support means in the guards of the present invention enable the guards to meet this dual requirement. The beam itself is, of course, constructed from a material strong enough, and fabricated in such a way as to absorb the impact forces of a collision and transmit the forces to the support means without excessive deformation.

BRIEF DESCRIPTION OF THE DRAWINGS

Further features and advantages of the present invention will become apparent from the following description and accompanying drawings and photographs, in which.

DETAILED DESCRIPTION OF THE PREFERRED EMBODIMENTS

Figure 1:
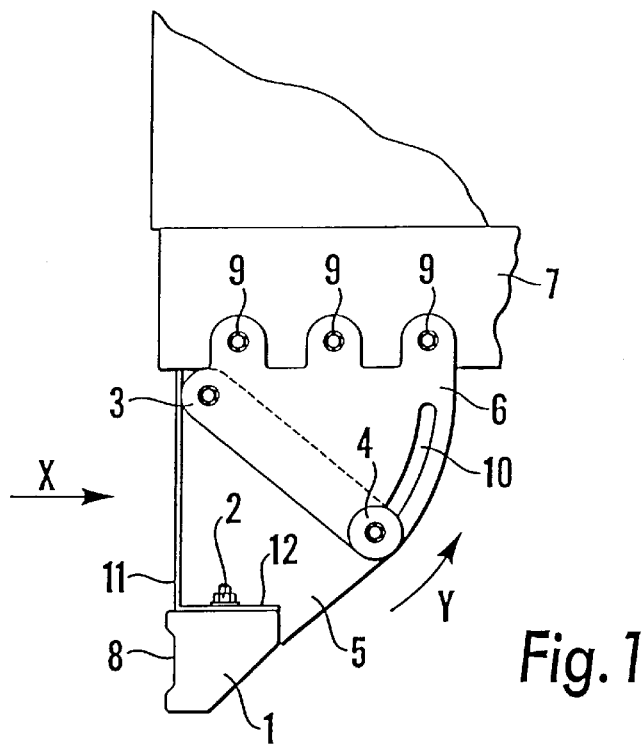
FIG. 1 is a side elevation of a first embodiment of the underrun guard fitted to the chassis of a road vehicle.
Figure 2:
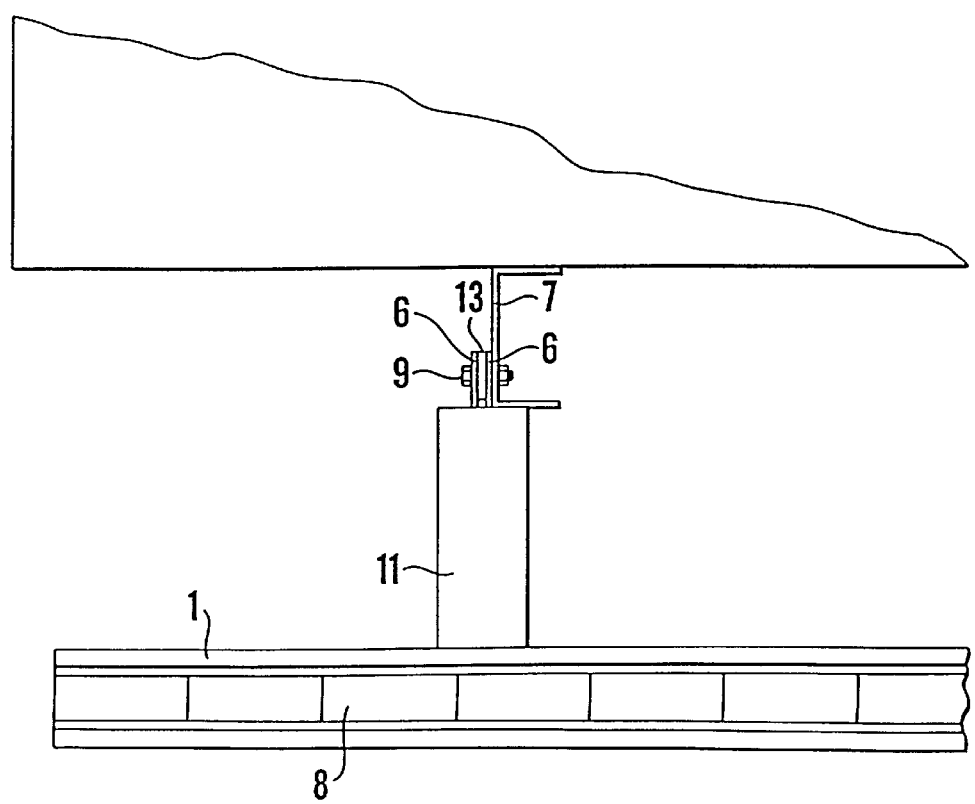
FIG. 2 is a view taken in the direction of the arrow X in FIG. 1.

Referring to FIGS. 1 and 2 of the drawings, the underrun guard comprises a tubular steel beam 1 which is connected to a support bracket comprising a steel plate 5, by means of a bolt 2. Plate 5 may be supported from the vehicle chassis beam 7 by a pair of plates 6. In some vehicles there is no chassis. Instead, the load-carrying part of the vehicle comprises a box member which is fitted near to the rear of the vehicle. The plates 6 may be formed with ears which are bolted to the beam 7 by bolts 9. As seen best in FIG. 2, the plates 6 may be bolted to one side of the beam 7 with a spacer washer 13. Support plate 5 is pivotally linked to the plates 6 at a pivot axis 3 so that plate 5 is pivotable about the axis 3. Plates 6 are clamped on each side of plate S so that a segment of support plate 5 (as indicated by dotted lines) extends between the clamping plates 6. Aligned slots 10 are provided in the plates 6 which are clamped together by a clamping bolt 4 to sandwich the segment of the support plate 5. Bolt 4 passes through slots 10.

The rearmost portion of the support plate 5 may be provided with a reinforcing web 11 and this may be extended horizontally as indicated at 12 to provide a surface for clamping the beam to the plate 5. In the case of an impact to the road vehicle in the direction of the arrow X in FIG. 1, the energy of impact will be absorbed by movement of the plate 5 in the same direction. This energy is absorbed by the support plate 5 being forced further between the plates 6 so that impact energy is absorbed by the friction of sliding movement between the surfaces of the plate 5 and the plates 6. Movement of the support plate 5 about the pivot 3 is guided by clamping bolt 4, moving in the slot 10. After impact the beam is pushed backwardly, rotating in the direction of the arrow Y, as shown in FIG. 1.

After the impact, the beam can be returned to its original position, depending vertically from the chassis, by loosening the clamping bolt 4. When the underrun beam is returned to its original rest position, the clamping bolt is retightened to provide its designed energy absorbing characteristics. This can be done by tightening the bolts to a designed tightness by using a torque spanner set to release at the required setting.

The energy of rearward movement of the beam 1 is absorbed by a frictional contact between the plate 5 and the plate 6 and this can be increased by tightening of the clamping bolt 4. Normally, the bumper 1 would be supported by a pair of plates 5 at points close to the lateral edges of the vehicle. In order to increase the frictional restraining force resisting an impact, more than one plate 5 and more than two interleaved clamping plates 6 may be provided at each location, thereby increasing the frictional resistance.

A light reflective or fluorescent strip 8 maybe affixed to the rearward face of the beam 1, win the longitudinal recess shown in FIG. 1.

Figure 3:
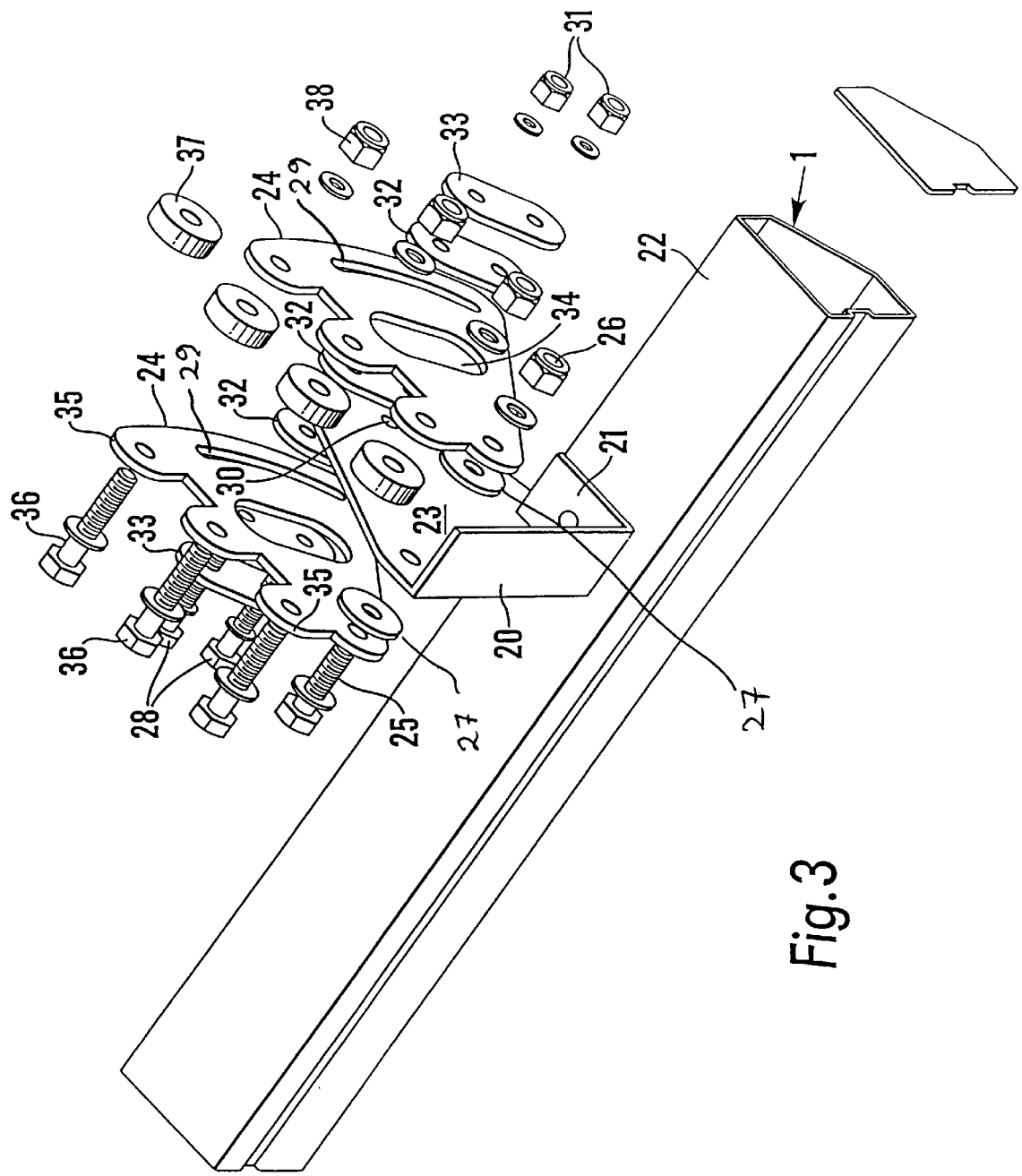
FIG. 3 is an exploded view of a second embodiment of underrun guard in accordance with the invention.

FIG. 3 is an exploded view of a second embodiment of the invention and FIGS. 4(a), (b) & (c) show the manner in which the guard shown in FIG. 3 may be fitted to a vehicle. In FIG. 3, a beam of hollow, box-section has a support bracket 20 which is fixed by a flange 21 to the upper face 22 of the beam. Bracket 20 includes an integral first plate 23 extending generally at right angles to the beam. A pair of plates 24 are disposed to sandwich the first plate 23 therebetween and are mounted for pivoting movement with respect to plate 23 by a common pivot bolt 25 which extends through aligned holes in the plates 24 and first plate 23, and engages with a nut 26. Washers 27 are provided between the clamping plates and the first plate. Plates 24 are formed as quadrants and when assembled, they overlap a segment of the first plate as seen best in FIG. 4(b). The plates 24 and the first plate 23 are clamped together with clamping bolts 28 which pass through slots 29 formed in the plates and holes 30 (only one is seen in FIG. 3), and are fastened by nuts 31. Sandwiched between each plate 24 and the first plate 23 is a frictional element 32 of frictional material. On the outer faces of the plates 24, a further frictional element 32 is clamped between the outer face of each plate 24 and a security plate 33. Plates 33 are conveniently formed from the same steel plate as the plates 24, and in the embodiment illustrated, are extracted from the plates 24 to leave a hole 34.

The plates 24 also carry at their top edges lugs or ears 35 for attaching the guard to the rear of a vehicle. For this purpose, attachment bolts 36 are provided. These bolts pass through aligned holes in the plates 24 and through spacer washers 37 and fixing nuts 38.

One method of attaching the guard to the longitudinal joists 40 at the rear end of a road vehicle 41 is shown in FIGS. 4(a), and 4(b). Bolts 36 are passed through holes in the joists 40 to fix the beam 1 to the rear end of the vehicle at two points across its width. For alternative fixing, the lugs 35 may be turned through 90 degrees for attachment to a horizontal surface. In some cases, in order to meet a height requirement from the ground, the support brackets may be attached by spacer fixing plates (not shown).

Before fitting the guard to the rear of the vehicle, the clamping bolts and lock-nuts 28 and 31 are tightened to a torque of about 300 ft/lbs.

Figure 4:
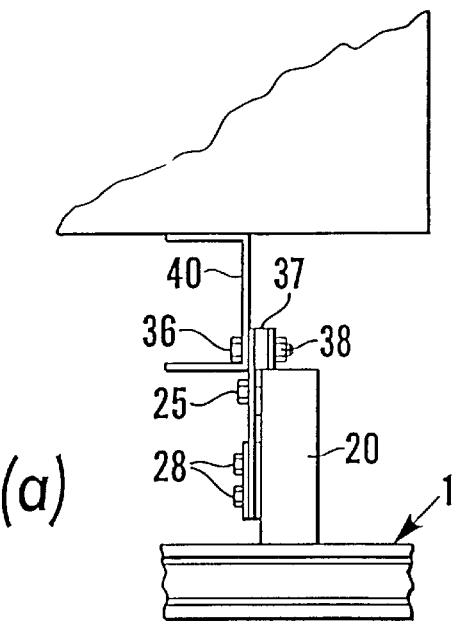
FIGS. 4(a) and 4(b) are partial side elevations showing one manner of fitting the guard of FIG. 3 to a vehicle.
Figure 4:
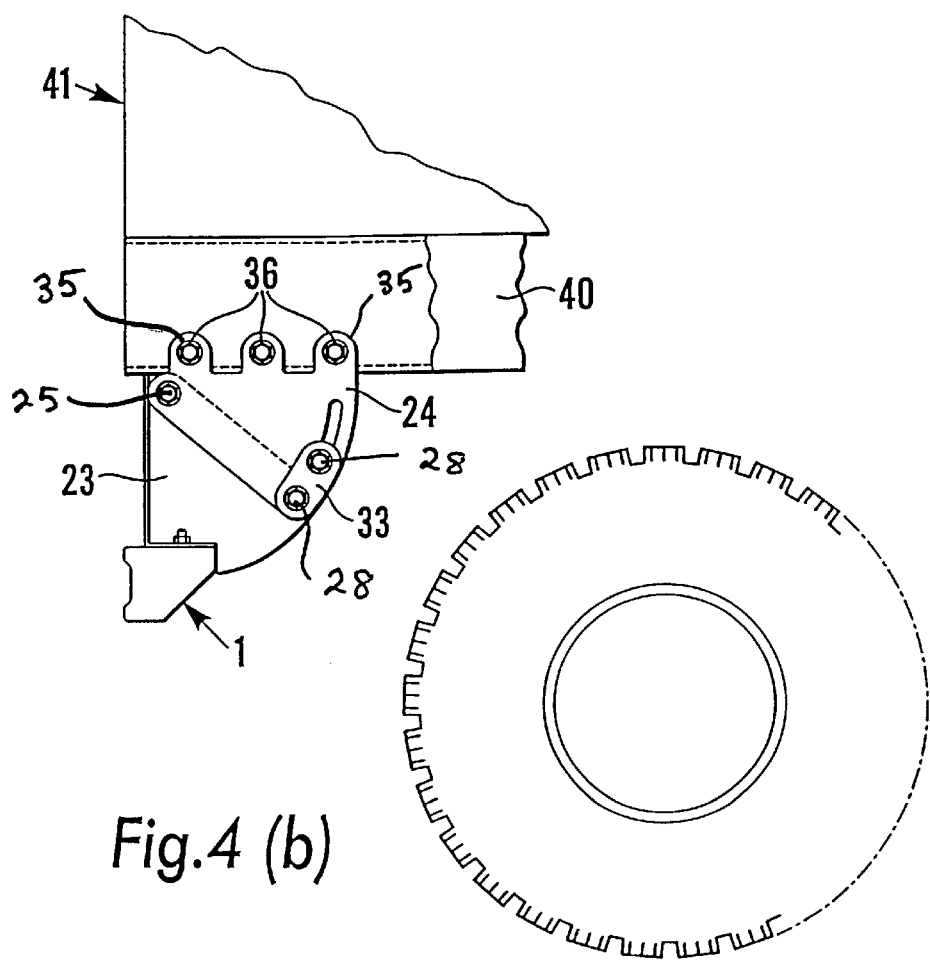
Figure 5:
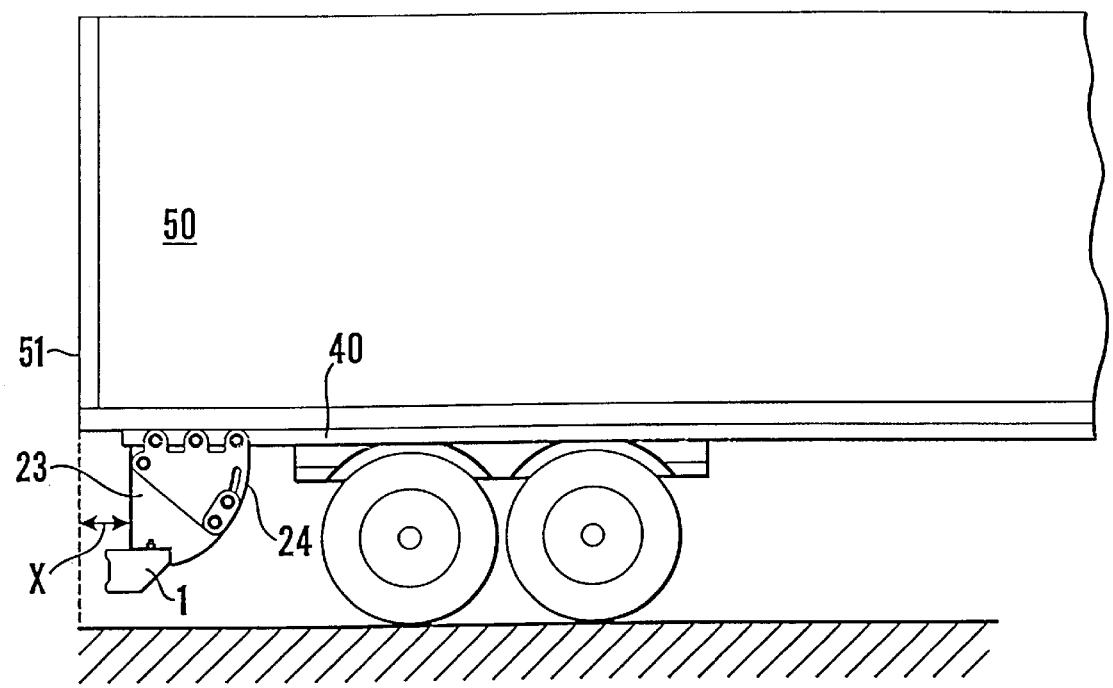
FIG. 5 is a diagrammatic side elevation of a guard in accordance with the invention fitted to a vehicle.

FIG. 5 shows diagrammatically an underrun guard in accordance with the invention, fitted to the rear of a road trailer portion 50 of a vehicle. The guard is fitted to comply with regulations relating to the maximum and minimum heights above the ground (indicated in FIG. 4(a)) and maximum dimension X by which the beam is inset from the rear extremity 51 of the vehicle. Currently, dimension X is 305 mm Current US Federal vehicle safety standards for rear impact guards require the guard to be subjected to loads of 50,000 N applied to two positions along the beam and a load of 100,000 N applied at a third point. The lower loads are applied on the center-line of the beam and at points which are ⅜ of the length of the beam from the center-line. The higher loads may be applied at points between 355 and 635 mm from the center-line.

Figure 6:
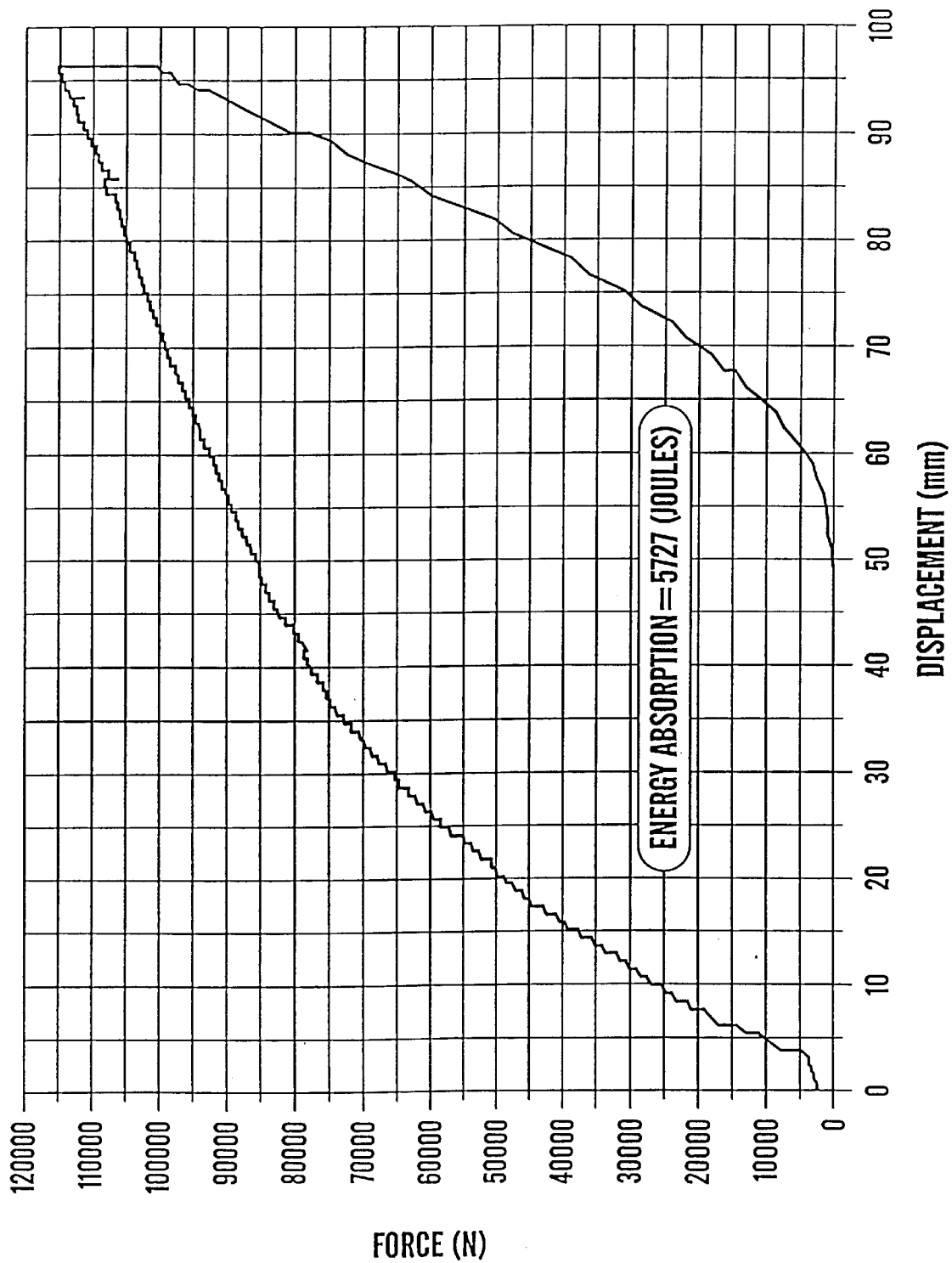
FIG. 6 is a graphical representation of the force-displacement curve of a guard as shown in FIG. 3 and was tested for compliance with the US federal standard for rear impact guards.

A guard constructed as shown in FIGS. 3 and 4(*a*), (*b*) & (*c*) was tested by this procedure and satisfied the standard. After the test, the guard could be reset and was ready for re-testing. A graphical plot of load-deflection obtained in the test applied at the higher load of 100,000 N is shown in FIG. 6. The standard portion beneath the curve represents the energy absorbed which was greater than 5650 J. The deflection was less than 125 mm in the test.

What is claimed is:

1. In a road transport vehicle having a front and a rear end and an underrun guard comprising a beam supported across the rear end by a support mechanism, said support mechanism comprising a bracket attached to the rear end of the vehicle by a frictional restraint connecting the bracket to the vehicle, said restraint being operative to absorb impact energy applied to the beam and to permit the beam to pivot to prevent excessive damage to the beam, wherein the support mechanism comprises a first plate for attachment to one of the vehicle and the bean, a pair of clamping plates for clamping a segment of the first plate therebetween and intended for attachment of the other of the beam and the vehicle, said first plate and said clamping plate being mounted for relative pivoting about a pivot point, whereby a collision impact to the beam causes said first plate to be forced further between the clamping plates thereby absorbing energy of said impact by generation of friction between the first place and the clamping plates.

2. The vehicle as claimed in claim 1 wherein at least one high friction element is clamped between the first plate and said clamping plates.

3. The vehicle as claimed in claim 1 said first plate is rigidly attached to the beam and the clamping plates are integrally formed with bracket means for attachment to a vehicle.

4. The vehicle as claimed in claim 2 wherein said clamping plates are clamped together by at least one bolt, said bolt passing through slots formed in the clamping plates wherein the slots permit relative pivoting movement between the first plate and the clamping plates.

5. A road transport vehicle having a front portion and a rear portion and an underrun guard fitted to said rear portion to reduce the risk of a second vehicle smaller than said road transport vehicle being forced under said rear portion in a collision, said guard comprising a beam extending horizontally substantially across said rear portion and support means for supporting said beam, said support means comprising a first plate fixedly attached to the beam or to said rear portion and a second plate fixedly attached to the other of said vehicle or beam, said first and second plates being pivotally connected to each other so that relative pivoting movement of said plates is resisted by friction generated between said plates.

6. A road transport vehicle as claimed in claim 5 wherein an element of high friction material is sandwiched between said first and second plates.

7. A road transport vehicle as claimed in claim 5 wherein said first and second plates are bolted together by at least one bolt, said bolt passing through a slot in one or both plates to permit relative pivoting movement between said plates in the event of an impact to the beam.

8. A road transport vehicle as claimed in claim 7 wherein said plates are bolted together under a loading which is such that in the event of a collision impact with the beam, said guard is capable of absorbing at least 5650 joules of energy while said beam is displaced by not more than 125 mm.

9. In a road transport vehicle having a front and a rear end and an underrun guard comprising a beam supported across the rear end by a support mechanism, wherein the support mechanism comprises a bracket attached to the rear end of the vehicle by means of a frictional restrain comprising first and second plates and a clamping member which clamps said first and second plates together, while permitting relative sliding movement of said bracket between said first and second plates under a load resulting from a collision impact to the underrun guard, said sliding movement generating friction for restraining said sliding movement and absorbing energy from said impact.

10. The vehicle as claimed in claim 9 wherein the beam has a hollow, box-like structure.

11. The vehicle as claimed in claim 9 wherein the beam has a longitudinally extending recess and a reflecting strip located within the recess and visible rearwardly when said guard is fitted to the rear of a vehicle.

12. The vehicle of claim 9, wherein said first and second plates have a high friction material therebetween.

13. The vehicle of claim 9, wherein an element of high friction material is disposed between said first and second plates.

* * * * *